US009593986B2

(12) United States Patent
Ito et al.

(10) Patent No.: US 9,593,986 B2
(45) Date of Patent: Mar. 14, 2017

(54) METHOD OF ESTIMATING MAGNET TEMPERATURE FOR ROTARY ELECTRIC MACHINERY

(71) Applicant: HONDA MOTOR CO., LTD., Tokyo (JP)

(72) Inventors: Yuta Ito, Utsunomiya (JP); Satoyoshi Oya, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 594 days.

(21) Appl. No.: 14/062,667

(22) Filed: Oct. 24, 2013

(65) Prior Publication Data

US 2014/0126606 A1 May 8, 2014

(30) Foreign Application Priority Data

Nov. 2, 2012 (JP) .................. 2012-243067

(51) Int. Cl.
- *G01K 1/20* (2006.01)
- *G01K 13/08* (2006.01)
- *G01K 7/36* (2006.01)
- *G01K 7/42* (2006.01)

(52) U.S. Cl.
CPC ............... *G01K 7/36* (2013.01); *G01K 7/427* (2013.01); *G01K 13/08* (2013.01)

(58) Field of Classification Search
CPC . H02K 9/06; H02K 9/79; H02K 11/00; G01K 13/08; G01K 17/00; G01K 1/20
USPC .. 374/4, 5, 137, 163, 208, 141, 153, 40, 39, 374/29; 324/200; 415/47
See application file for complete search history.

(56) References Cited

U.S. PATENT DOCUMENTS

| 4,024,909 | A | * | 5/1977 | Hofmann, Jr. ..... G05D 23/1333 165/297 |
| 5,319,963 | A | * | 6/1994 | Benford ................ F16H 59/72 374/141 |
| 6,489,697 | B1 | * | 12/2002 | Ozawa ..................... H02K 3/30 310/254.1 |
| 7,156,195 | B2 | | 1/2007 | Yamagishi et al. |
| 7,408,312 | B2 | | 8/2008 | Itou et al. |
| 7,677,041 | B2 | * | 3/2010 | Woollenweber ........ F01D 25/16 384/452 |

(Continued)

FOREIGN PATENT DOCUMENTS

| DE | 112008000467 T5 | 1/2010 |
| DE | 112010004773 T5 | 10/2012 |

(Continued)

OTHER PUBLICATIONS

Japanese Office Action dated Sep. 2, 2014, issued in corresponding Japanese Patent Application No. 2012-243067 with Partial English translation (5 pages).

(Continued)

*Primary Examiner* — Gail Kaplan Verbitsky
(74) *Attorney, Agent, or Firm* — Westerman, Hattori, Daniels & Adrian, LLP

(57) ABSTRACT

In a magnet temperature estimating method, in the event that a rotor of a rotary electric machine is cooled by a cooling oil, a magnet temperature calculator estimates the magnet temperature of magnets provided on the rotor, based on losses of the rotary electric machine including a loss of the rotor and the temperature of the cooling oil.

13 Claims, 12 Drawing Sheets

(56) References Cited

U.S. PATENT DOCUMENTS

| | | | | |
|---|---|---|---|---|
| 7,898,143 | B2* | 3/2011 | Nonaka | H02K 5/08 310/215 |
| 7,969,051 | B2* | 6/2011 | Vasilescu | H02K 9/04 310/62 |
| 8,063,519 | B2* | 11/2011 | Smith | H02K 9/04 310/52 |
| 8,307,929 | B2* | 11/2012 | Miura | B60K 6/445 180/65.265 |
| 8,323,134 | B2* | 12/2012 | Tsukada | F16H 61/66259 474/144 |
| 8,618,752 | B2* | 12/2013 | Zing | B60L 15/2045 180/65.22 |
| 8,648,575 | B2* | 2/2014 | Cullen | H02P 29/0066 310/181 |
| 9,154,006 | B2 | 10/2015 | Yamamoto et al. | |
| 2006/0068953 | A1* | 3/2006 | Tsukada | F16H 61/66259 474/8 |
| 2008/0087018 | A1* | 4/2008 | Woollenweber | F01D 25/16 60/605.3 |
| 2009/0224715 | A1* | 9/2009 | Smith | H02K 9/197 318/471 |
| 2009/0261667 | A1* | 10/2009 | Matsubara | H02K 1/2766 310/54 |
| 2009/0282903 | A1* | 11/2009 | Nagano | F02D 41/0097 73/114.15 |
| 2009/0284202 | A1* | 11/2009 | Miura | G01K 7/42 318/473 |
| 2010/0204862 | A1* | 8/2010 | Uejima | B60K 6/445 701/22 |
| 2010/0283336 | A1* | 11/2010 | Vasilesco | H02K 9/04 310/62 |
| 2012/0019172 | A1* | 1/2012 | Zing | B60L 15/2045 318/8 |
| 2012/0146683 | A1* | 6/2012 | Tanimoto | B60L 3/0061 324/765.01 |
| 2012/0183875 | A1* | 7/2012 | Yumita | H01M 8/04223 429/434 |
| 2013/0169073 | A1 | 7/2013 | Nagahama et al. | |
| 2013/0294888 | A1* | 11/2013 | Yokoyama | H02K 1/32 415/47 |
| 2014/0070637 | A1* | 3/2014 | Hamer | H02K 15/03 310/54 |
| 2014/0121094 | A1* | 5/2014 | Hodotsuka | B04B 9/10 494/7 |
| 2014/0125165 | A1* | 5/2014 | Miyamoto | H02K 9/19 310/54 |
| 2014/0126606 | A1* | 5/2014 | Ito | G01K 7/427 374/163 |
| 2014/0126607 | A1* | 5/2014 | Oya | G01K 7/427 374/163 |
| 2014/0191696 | A1* | 7/2014 | Hattori | H02K 9/19 318/473 |
| 2014/0264112 | A1* | 9/2014 | Reisch | F16D 25/123 251/129.11 |
| 2015/0120156 | A1* | 4/2015 | Leim | F16H 61/688 701/59 |
| 2015/0303860 | A1* | 10/2015 | Imanishi | H02K 21/14 318/473 |
| 2016/0129811 | A1* | 5/2016 | Zing | B60L 15/2045 701/22 |

FOREIGN PATENT DOCUMENTS

| | | | |
|---|---|---|---|
| JP | 9-226394 A | 9/1997 | |
| JP | 2000-23421 A | 1/2000 | |
| JP | 2004-166492 A | 6/2004 | |
| JP | 2007-202243 A | 8/2007 | |
| JP | 2008-109816 A | 5/2008 | |
| JP | 2008178243 A1 * | 7/2008 | |
| JP | 4572907 B2 | 11/2010 | |
| JP | WO 2012114419 A1 * | 8/2012 | H02K 1/32 |
| KR | 101340403 B1 * | 12/2013 | H02K 1/32 |
| WO | 2005/093942 A1 | 10/2005 | |
| WO | 2012/046307 A1 | 4/2012 | |

OTHER PUBLICATIONS

Office Action dated Mar. 11, 2016, issued in counterpart German Patent Application No. 10 2013 222 208.4, with English translation. (10 pages).

Search Report dated Feb. 29, 2016, issued in counterpart German Patent Application No. 10 2013 222 208.4, with English translation. (16 pages).

* cited by examiner

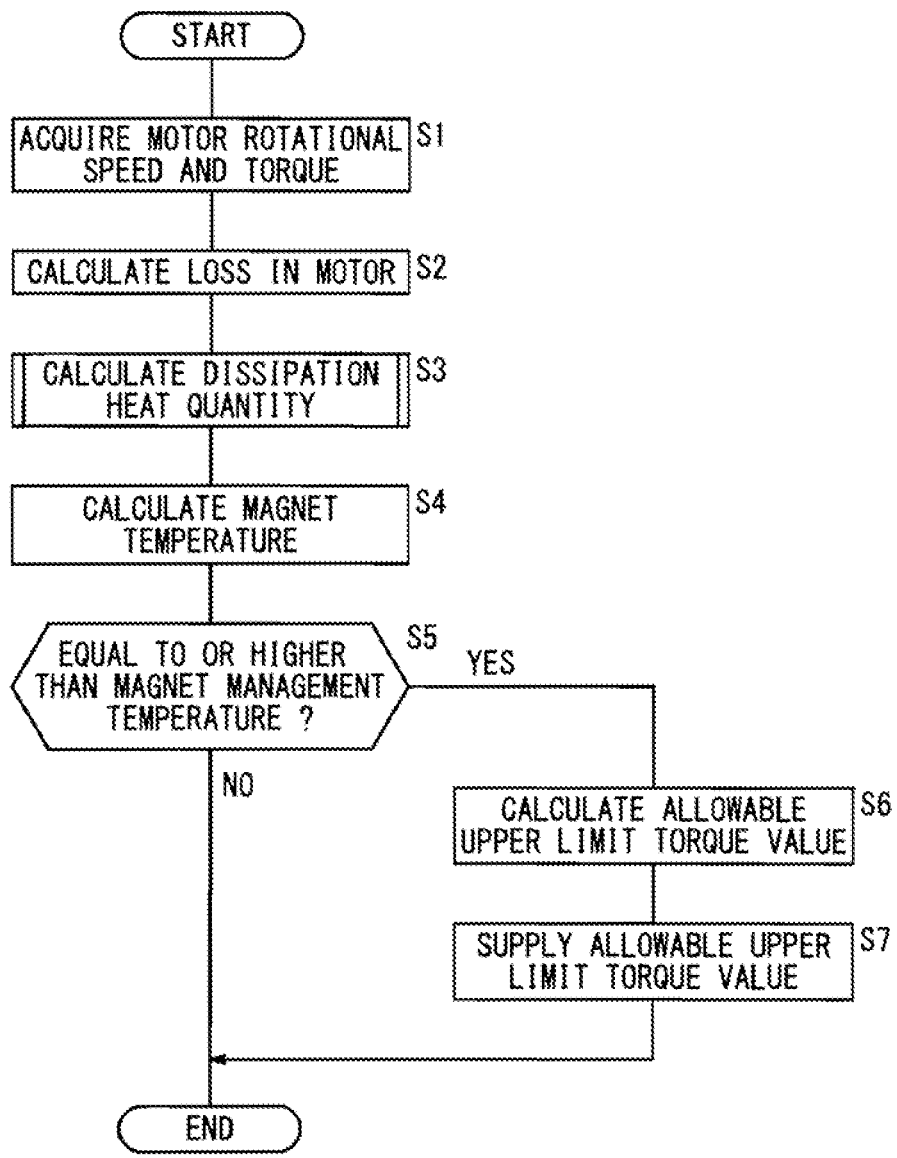

METHOD OF ESTIMATING MAGNET TEMPERATURE FOR ROTARY ELECTRIC MACHINERY

CROSS-REFERENCE TO RELATED APPLICATION

This application is based upon and claims the benefit of priority from Japanese Patent Application No. 2012-243067 filed on Nov. 2, 2012, the contents of which are incorporated herein by reference.

BACKGROUND OF THE INVENTION

Field of the Invention

The present invention relates to a method of estimating the temperature of magnets (hereinafter referred to as a "magnet temperature") on a rotating member of a rotary electric machine.

Description of the Related Art

Rotary electric machines include a rotor and a stator that include magnets. When the temperatures of the rotor and the stator exceed a threshold temperature, the magnets start to become demagnetized. Therefore, it is necessary to appropriately manage the temperatures of the rotor and the stator in order to prevent the rotor and the stator from exceeding the threshold temperature. In order to carry out such temperature management, it is desirable to directly detect the temperatures of the rotor and the stator.

The temperature of the stator can easily be detected since the stator is fixed to the machine casing. However, since the rotor is a rotating member, it is more complicated to detect the temperature of the rotor. More specifically, the temperature of the rotor needs to be detected by reading a detection signal from a temperature sensor, which is mounted on the rotor through a slip ring, or on a rotary connector that is mounted on the shaft of the rotor. The mechanism for detecting the temperature of the rotor makes the rotary electric machine complex in structure and costly to manufacture.

Japanese Patent No. 4572907 discloses that the rotational speed of the rotor of a motor, the temperature of the stator coils of the motor, and the temperature of a coolant for cooling the stator of the motor are detected, and the temperatures of the magnets (magnet temperatures) on the rotor and the stator are estimated based on operating points (a torque command value and the rotational speed of the rotor) of the motor, the detected temperatures, and a thermal model between the magnets on the rotor and the stator.

Further, in Japanese Laid-Open Patent Publication No. 2000-023421, a stator-side oil-cooling system and a rotor-side oil-cooling system are provided separately, and cooling oil is circulated in each of the stator-side cooling system and the rotor-side cooling system. In the case of cooling the stator and the rotor, the temperature of the rotor is estimated based on an inflow temperature of the cooling oil prior to cooling the rotor, an outflow temperature of the cooling oil after cooling the rotor, the motor torque, and the rotational speed of the motor.

SUMMARY OF THE INVENTION

With the technique of Japanese Patent No. 4572907, the magnet temperature is estimated based on a thermal model in which a thermal gradient is set in order of the rotor magnets, the stator coils, and the cooling oil. More specifically, the technique of Japanese Patent No. 4572907 carries out an estimation of the magnet temperature premised on the magnet temperature being higher than the temperature of the stator coils, and heat being transferred from the magnets, through the stator coils, to the cooling oil.

However, in the event that the temperature of the stator coils is higher than the magnet temperature, radiation of heat from the magnets toward the stator coils does not occur, but instead, the magnets receive heat from the stator coils, and the temperature of the magnets is raised to the same temperature as that of the stator coils. More specifically, if the temperature of the stator coils is higher than the magnet temperature, heat cannot be radiated from the magnets to the stator coils, and as a result, the accuracy with which the magnet temperature is estimated becomes deteriorated, and there is a concern that the magnet temperature will be estimated to be higher than the actual magnet temperature.

With an actual rotary electric machine, since the stator and the rotor are separated through an air gap with low thermal conductivity, it is difficult for heat to be transferred from the stator coils to the magnets and the rotor through such an air gap. For this reason, heat from the magnets is radiated primarily through the rotor. Consequently, with the technique of Japanese Patent No. 4572907, estimation of the magnet temperature is carried out without any consideration being given to the actual heat transfer path.

Moreover, with a structure in which cooling of the stator and the rotor is carried out separately using a stator-side cooling system and a rotor-side cooling system, as in Japanese Laid-Open Patent Publication 2000-023421, cases are known to occur in which the temperature of the stator coils is higher than the magnet temperature. Further, with the technique of Japanese Laid-Open Patent Publication 2000-023421, sensors must be provided, respectively, for detecting the inflow temperature, the outflow temperature, the motor torque, and the rotational speed of the motor, leading to an increase in cost.

It is an object of the present invention to provide a method of accurately estimating the magnet temperature of magnets on a rotating member of a rotary electric machine.

In order to achieve the aforementioned object, according to the present invention, when at least the rotating member of the rotary electric machine is cooled by a coolant, a magnet temperature estimator estimates the magnet temperature based on the temperature of the coolant and a loss of the rotating member including the magnets.

The rotary electric machine is made up from a rotor as a rotating member, and a stator, wherein the rotor and the stator are separated by an air gap. For this reason, it is difficult for heat to be transferred between the rotor and the stator. Accordingly, heat generated in the magnets that are provided in the rotor (rotating member) is easily transferred through the rotating member to the coolant that cools the rotating member. Further, in the rotating member, the loss of the rotating member is converted into heat, and such heat is transferred to the coolant.

Thus, with the present invention, the magnet temperature is estimated while considering the temperature of the coolant influenced by heat that is transferred to the coolant from the magnets and the rotating member, as well as the loss in the rotating member that causes heat generation in the rotating member. In this manner, any deviation of the estimated magnet temperature from the actual magnet temperature is minimized, thus making it possible to estimate the magnet temperature more accurately.

Further, since the loss of the rotating member can be specified by measurements taken beforehand, as long as the temperature of the coolant is known, the magnet temperature can easily be estimated. More specifically, with the present invention, since the magnet temperature is estimated using only the temperature of the coolant, sensors needed to estimate the magnet temperature can be limited only to a temperature sensor that detects the temperature of the coolant, the number of sensors can be minimized, and the cost of the sensors and the number of assembly steps for such sensors can be suppressed.

Since the magnet temperature is estimated with increased accuracy, it is possible to lower the heat resistance (demagnetization resistance) of the magnets and to reduce the coercive force of the magnets. Consequently, the amount of dysprosium (Dy) contained in the magnets can be reduced. It is thus possible to manufacture a rotary electric machine that meets various specifications and in which the magnets thereof are less expensive.

The rotary electric machine may be controlled by a control system, wherein the rotary electric machine needs to enter a power save mode each time that the magnet temperature approaches a limit temperature (upper limit temperature). In such a control system, since the accuracy with which the magnet temperature is estimated is increased, the power save mode is prevented from being carried out unnecessarily, and the frequency at which the rotary electric machine enters the power save mode is lowered. As a result, fuel consumption of the vehicle is reduced during times that the vehicle is subjected to high loads, and the drivability and commercial value of the vehicle are increased.

More specifically, with the present invention, the magnet temperature may be estimated in accordance with the following features of the present invention.

[1] The magnet temperature estimator may estimate the magnet temperature based on a thermal model in which a thermal gradient is set in order of the magnets, the rotating member, and the coolant. Accordingly, in the rotary electric machine in which the rotating member is cooled by the coolant, the magnet temperature can be estimated accurately even in the event that the temperature of the stator coils becomes greater than the magnet temperature.

In particular, by cooling the rotational shaft of the rotating member with the coolant, the rotating member including the magnets may be cooled. More specifically, the rotational shaft may be a tubular member, and the rotational shaft may be cooled by flow of the coolant through a hollow portion of the tubular member. With the above structure, heat transfer can be performed in order of the magnets→the rotating body→the coolant, and therefore, the aforementioned effects can easily be obtained.

[2] A loss calculator may be provided, which calculates the loss of the rotating member based on a rotational speed and a torque of the rotating member. By using the rotational speed and the torque of the rotating member, which serve as operating points of the rotary electric machine, the loss of the rotating member can be calculated accurately.

In this case, if a loss map representative of a relationship between the rotational speed, the torque, and the loss is stored in a storage unit, and the loss calculator determines the loss corresponding to the rotational speed and the torque by referring to the loss map, the loss can be calculated easily and accurately. Further, when a vehicle having the rotary electric machine mounted therein is running, even in the event that the rotary electric machine is operated in a complex manner due to the way in which the vehicle is running, by determining the loss corresponding to the rotational speed and the torque with reference to the loss map, the magnet temperature can be estimated with good estimation accuracy.

The rotational speed may be detected by a rotational speed sensor and be output to the loss calculator, and the torque may be detected by a torque sensor and be output to the loss calculator, or alternatively, a value of a current that flows in the rotary electric machine may be detected by a current sensor, and be output to the loss calculator. In this case, the loss calculator can calculate the loss of the rotating member using the detected speed of rotation and the detected torque, or alternatively, can calculate the torque from the detected current value, and then can calculate the loss of the rotating member using the detected speed of rotation and the calculated torque. In this case as well, the loss can be calculated easily and accurately.

Further, the current value serves as an operating point of the rotary electric machine together with the rotational speed and the torque of the rotating member. By calculating the loss of the rotating member based on the operating points of the rotary electric machine, accuracy in estimating the magnet temperature can be further enhanced.

[3] A dissipation heat calculator may calculate a dissipation heat amount of the magnets based on a flow rate and the temperature of the coolant, and the magnet temperature estimator may estimate the magnet temperature based on the calculated loss and the calculated dissipation heat amount. In this manner, any deviation between the estimated magnet temperature and the actual magnet temperature can be suppressed to a greater degree by taking into consideration the calculated loss and the calculated dissipation heat amount.

In this case, if a flow rate map, which is representative of a relationship between the rotational speed of the rotating member and the flow rate, is stored in the storage unit, and the dissipation heat calculator determines the flow rate corresponding to the rotational speed by referring to the flow rate map, the flow rate can be calculated easily and accurately, and therefore, the dissipation heat amount can be calculated with greater precision. Further, when a vehicle having the rotary electric machine mounted therein is running, even in the event that the rotary electric machine is operated in a complex manner due to the way in which the vehicle is running, by determining the flow rate corresponding to the rotational speed with reference to the flow rate map, the magnet temperature can be estimated with good estimation accuracy.

In the present invention, in the event that the rotary electric machine is accommodated in a casing, a bottom of the casing is formed as a drain in which the coolant that has cooled the rotating member is stored. A temperature sensor, which detects the temperature of the coolant stored in the drain, and a pump, which aspirates the coolant stored in the drain and delivers the coolant to the rotating member, may be disposed in the casing. If constructed in this manner, the magnet temperature estimator can estimate the magnet temperature based on the loss and the temperature detected by the temperature sensor. Further, since the coolant is aspirated by the pump and supplied to the rotating member, the rotating member can be cooled with good efficiency.

In the event that the rotating member is an inner rotor type and magnet-embedded type of rotating member in which the magnets are embedded in the rotating member, heat of the magnets is transferred to the rotor around the magnets, whereby a large thermal influence is received by the rotor yoke that constitutes part of the rotor. In this case as well, through application of the present invention, and by taking into consideration heat that is generated due to a loss (eddy current loss) of the magnets, and heat that is generated due to a loss (iron loss) of the rotor yoke, errors in estimating the magnet temperature can be reduced.

The rotary electric machine may be a vehicular rotary electric machine for driving a vehicle, wherein the rotary electric machine may be mounted in the vehicle and the rotating member thereof may be connected to a transmission, and the coolant may comprise a lubricating oil for lubricating the transmission.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 is a flowchart of an operational sequence for estimating a magnet temperature according to the present embodiment;

DESCRIPTION OF THE PREFERRED EMBODIMENTS

Figure 1:
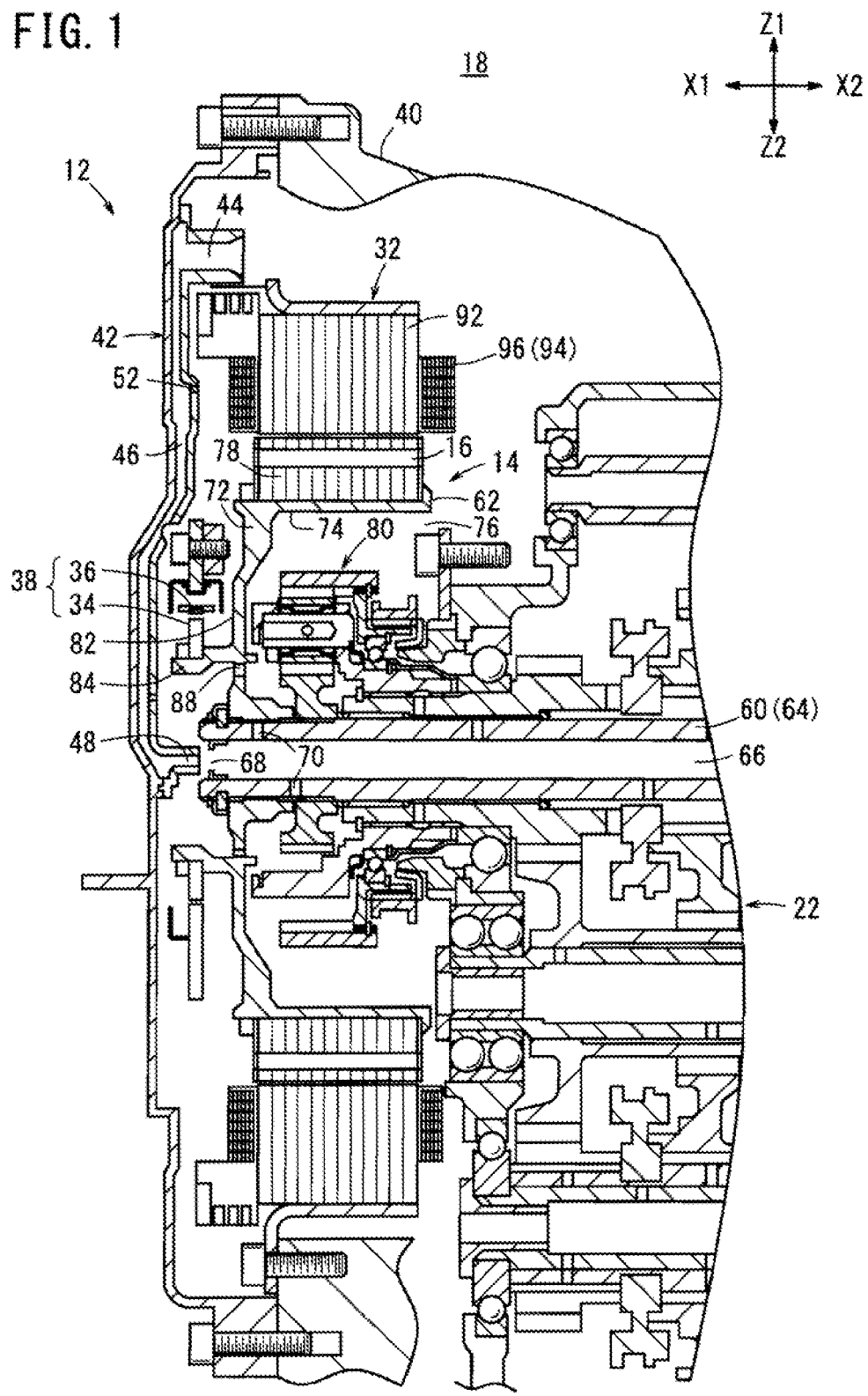
FIG. 1 is a fragmentary cross-sectional view of the cooling system of a vehicle that incorporates a rotary electric machine therein.

A method of estimating a magnetic temperature according to a preferred embodiment of the present invention will be described in detail below with reference to FIGS. 1 through 12.

[General Structure of Vehicle that Incorporates a Rotary Electric Machine Therein]

A magnet temperature estimating apparatus 10 (see FIG. 4), which carries out the method of estimating a magnetic temperature according to the present embodiment, serves as an apparatus for estimating the temperature $T_{MAG}$ of magnets 16 (hereinafter referred to as a "magnet temperature $T_{MAG}$") on a rotor 14 (rotating member) of a rotary electric machine 12. The rotary electric machine 12, which includes magnets 16 the temperature of which is to be estimated, is incorporated in a vehicle 18 such as a hybrid vehicle or an electric vehicle.

Figure 4:
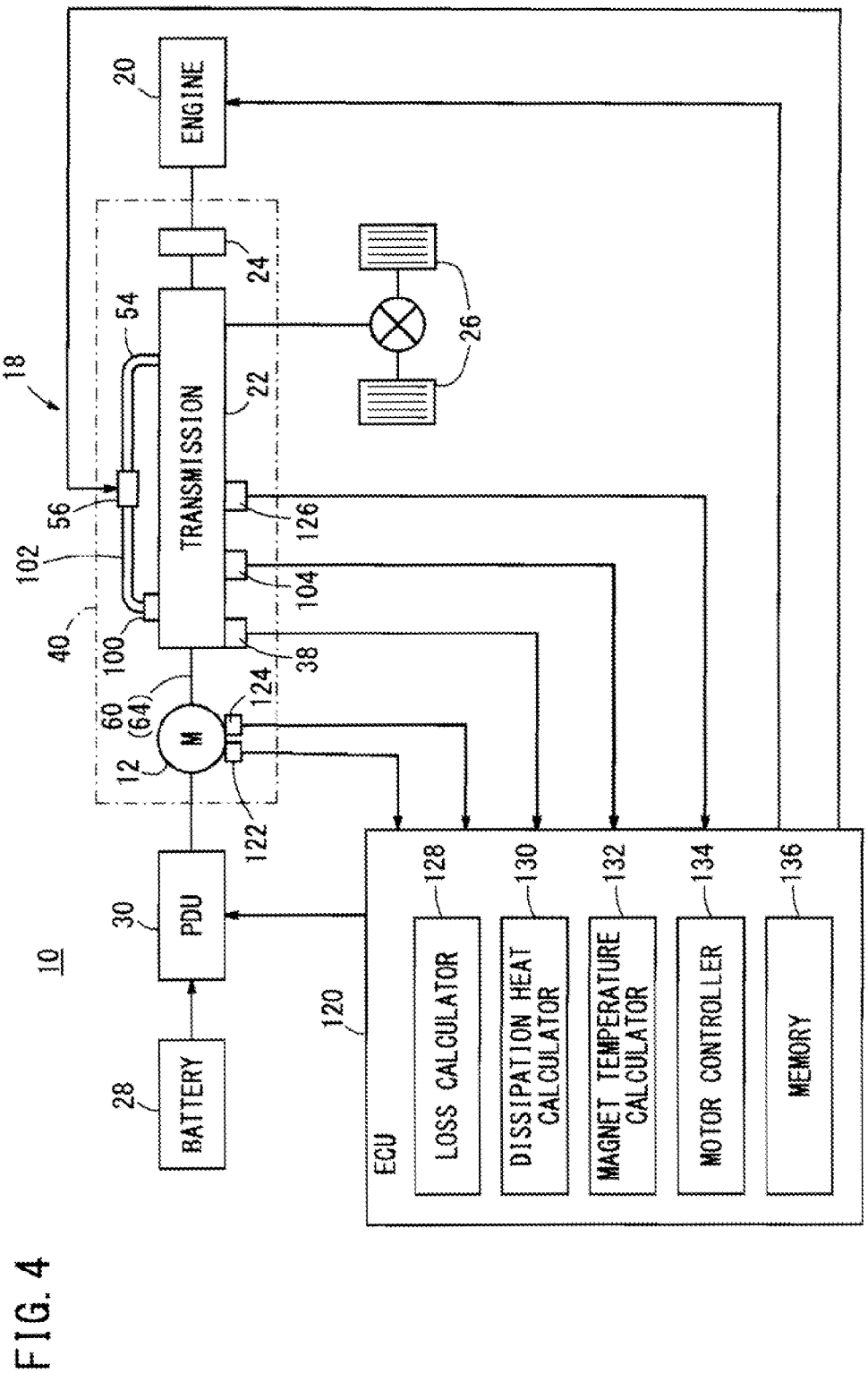
FIG. 4 is a block diagram of a magnet temperature estimating apparatus according to an embodiment of the present invention.

FIG. 4 shows the vehicle 18 in the form of a hybrid vehicle, for example. The vehicle 18 has an engine 20 and a transmission 22, with a clutch 24 disposed between the engine 20 and the transmission 22. The transmission 22, which serves as a power transmitting mechanism, is an automatic transmission as a drive source for transmitting drive power from the engine 20 or the rotary electric machine 12 to drive wheels 26 in order to propel the vehicle 18.

Figure 2:
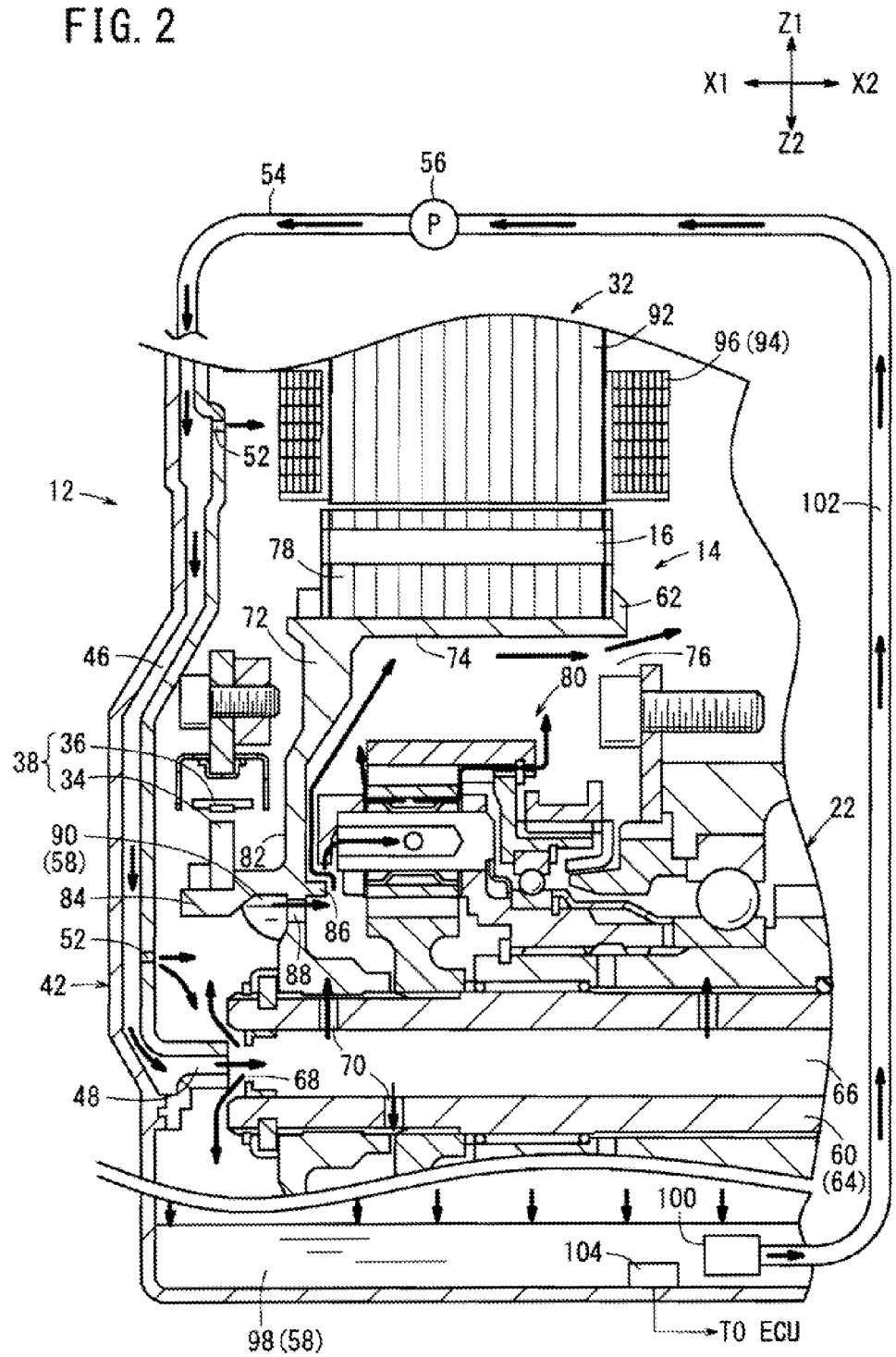
FIG. 2 is a fragmentary cross-sectional view showing flows of a lubricating oil in the rotary electric machine shown in FIG. 1.

According to the present embodiment, as shown in FIGS. 1 and 2, the transmission 22 includes a portion disposed radially inward of the rotor 14 of the rotary electric machine 12.

The rotary electric machine 12, which comprises a three-phase AC brushless motor, for example, generates drive power for propelling the vehicle 18 based on electric power supplied from a battery 28 through a PDU (Power Drive Unit) 30. Further, when the vehicle 18 operates in a regenerative mode, the rotary electric machine 12 regenerates electric power and supplies the regenerated electric power through the PDU 30 to the battery 28, thereby charging the battery 28.

According to the present embodiment, a method of estimating a magnetic temperature $T_{MAG}$ is applied to a type of rotary electric machine known as an IPM (Internal Permanent Magnet) motor, which includes a magnet-embedded rotor, i.e., a rotor with permanent magnets embedded therein. The method of estimating the magnetic temperature $T_{MAG}$ according to the present embodiment may also be applied to a type of rotary electric machine known as an SPM (Surface Permanent Magnet) motor, which includes a rotor with permanent magnets mounted on the surface thereof.

Figure 3:
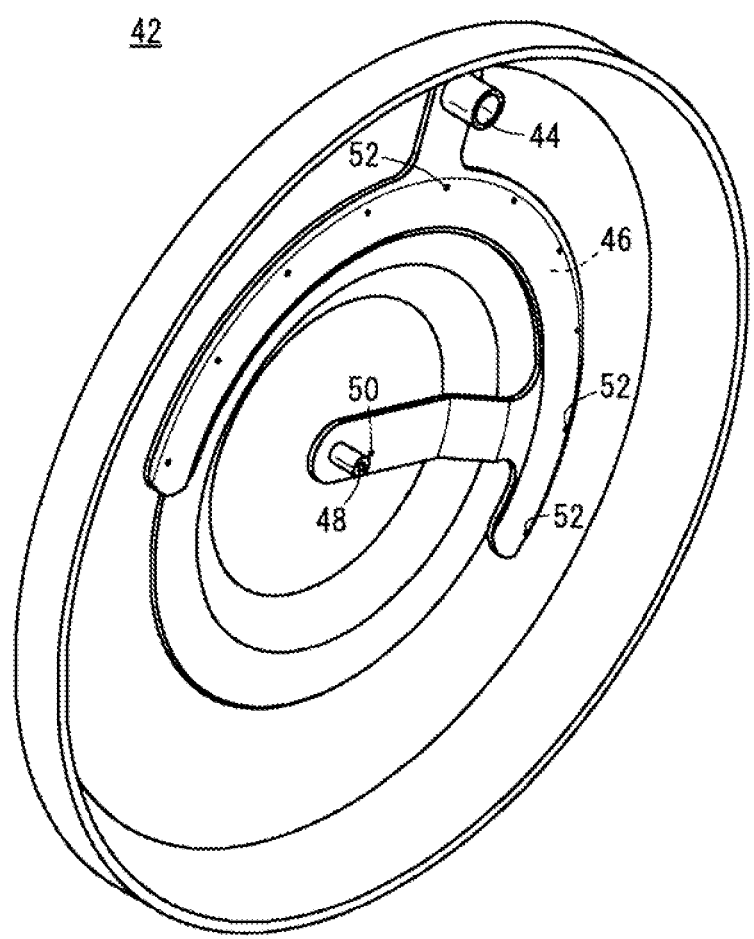
FIG. 3 is a perspective view of a side cover that functions as part of the cooling system shown in FIG. 1.

Prior to describing the magnet temperature estimating apparatus 10, the rotary electric machine 12, which is incorporated in the vehicle 18, will be described below with reference to FIGS. 1 through 3.

The rotary electric machine 12 includes a rotor 14 serving as an inner rotor, a stator 32 disposed around the rotor 14, and a resolver (rotational speed sensor) 38 having a resolver rotor 34 and a resolver stator 36. The rotary electric machine 12 is accommodated in a housing 40, and the housing (casing) 40 is closed by a side cover 42.

The side cover 42 comprises a disk-shaped lid covering the rotary electric machine 12 that is accommodated in the housing 40. The side cover 42 includes a single inlet hole 44, a fluid passage 46, a single first outlet hole 48, a single second outlet hole 50, and a plurality of third outlet holes 52. The inlet hole 44 is connected to a fluid passage 54, and a cooling oil (coolant, fluid) 58 is supplied to the inlet hole 44 from a pump 56 through the fluid passage 54.

The cooling oil 58 preferably is a lubricating oil for lubricating the transmission 22. An ATF (Automatic Transmission Fluid) may be used as the cooling oil 58. The pump 56 may either be an electric pump or a mechanical pump. The cooling oil 58 is supplied from the pump 56 through the inlet hole 44 to the fluid passage 46 at times that the rotor 14 is rotated during operation of the rotary electric machine 12 and the transmission 22. As shown in FIG. 2, the solid-line arrows indicate flows of the cooling oil 58 in the vehicle 18.

The first, second, and third outlet holes 48, 50, 52, which are in the form of nozzles, eject or discharge the cooling oil 58 supplied from the pump 56 through the fluid passage 54, the inlet hole 44, and the fluid passage 46 toward the rotor 14 and the stator 32. More specifically, the first outlet hole 48 primarily ejects or discharges the cooling oil 58 toward a rotational shaft 60 of the rotor 14. The second outlet hole 50 primarily ejects or discharges the cooling oil 58 toward a bottomed tubular member 62 of the rotor 14. The third outlet holes 52 primarily eject or discharge the cooling oil 58 toward the stator 32.

As described above, the transmission 22 is a portion disposed radially inward of the rotor 14 of the rotary electric machine 12. According to the present embodiment, the transmission 22 comprises a shaft 64, a portion of which is positioned within the rotary electric machine 12 and serves as the rotational shaft 60 of the rotor 14. In other words, the rotor 14 including the magnets 16 and the shaft 64 of the transmission 22 are coupled integrally to each other.

The rotational shaft 60, i.e., the shaft 64, is in the form of a tubular member having a first axial fluid passage 66 defined therein, which extends along an axial direction indicated by the arrows X1, X2 in FIGS. 1 and 2. The first axial fluid passage 66 has an axial opening 68 defined in one end thereof, which faces the first outlet hole 48. The axial opening 68 is held in fluid communication with the first axial fluid passage 66, for guiding the cooling oil 58 that is ejected or discharged from the first outlet hole 48 into the first axial fluid passage 66. The rotational shaft 60 has a plurality of second axial fluid passages 70, which are defined radially in a circumferential wall thereof, and which keep the first axial fluid passage 66 in fluid communication with a space surrounding the rotational shaft 60.

When the cooling oil 58 is ejected or discharged from the first outlet hole 48 through the axial opening 68 into the first axial fluid passage 66, the cooling oil 58 is discharged radially from the rotational shaft 60 through the second axial fluid passages 70. The discharged cooling oil 58 flows into the rotor 14, or is supplied to a portion of the transmission 22, e.g., a planetary gear mechanism 80, to be described later.

The bottomed tubular member 62 of the rotor 14 is mounted in a substantially coaxial manner on the rotational shaft 60. The bottomed tubular member 62 has a bottom 72, which is fixed to the outer circumferential surface of the rotational shaft 60 near the side cover 42, and an annular side wall 74, which extends from an outer edge of the bottom 72 in the axial direction indicated by the arrow X2. The bottom 72 and the annular side wall 74 jointly define an opening 76, which opens in the axial direction indicated by the arrow X2. The planetary gear mechanism 80 of the transmission 22 is accommodated in the opening 76. A rotor yoke 78 of the rotor 14 is disposed together with the magnets 16 on an outer circumferential surface of the side wall 74.

The bottom 72 includes a base 82, a first protruding wall 84 that projects from the base 82 toward the side cover 42, and a second protruding wall 86 that projects from the base 82 toward the transmission 22. The base 82 extends radially in the radial direction, as indicated by the arrows Z1, Z2 in FIGS. 1 and 2, and includes a plurality of through holes 88 defined axially therein along the axial direction indicated by the arrows X1, X2. When the cooling oil 58 is ejected from the side cover 42 toward the bottom 72, the cooling oil 58 flows through the through holes 88 into the tubular member 62, i.e., the opening 76.

The base 82 and the first protruding wall 84 jointly define a space in the vicinity of the through holes 88. The space serves as a reservoir 90 for keeping the cooling oil 58 under centrifugal forces generated when the rotor 14 rotates. Therefore, initially, even if the cooling oil 58 does not enter directly into the through holes 88, the cooling oil 58 is maintained temporarily in the reservoir 90, and thereafter the cooling oil 58 flows through the through holes 88 into the opening 76. Furthermore, since the first protruding wall 84 projects to a position near the side cover 42, even if the cooling oil 58 in the first axial fluid passage 66 overflows the axial opening 68, the overflowing cooling oil 58 flows from the inner circumferential surface of the first protruding wall 84, through the reservoir 90 and the through holes 88, and into the opening 76 under gravitational forces, or under centrifugal forces that are generated when the rotor 14 rotates.

The base 82 and the first protruding wall 84 have oblique surfaces that make an inlet area of the reservoir 90, which is supplied with the cooling oil 58, progressively greater in diameter in the axial direction indicated by the arrow X2. The inlet area of the reservoir 90, which spreads radially outward, allows the cooling oil 58 to be kept easily in the reservoir 90, and is effective to reduce the amount of cooling oil 58 that does not flow through the through holes 88 into the opening 76.

As described above, the planetary gear mechanism 80 is accommodated in the opening 76. The cooling oil 58, which is introduced through the through holes 88, is guided by the second protruding wall 86, and then the cooling oil 58 is discharged radially outward under centrifugal forces generated upon rotation of the rotor 14. A portion of the cooling oil 58, which is discharged radially outward, is supplied to the planetary gear mechanism 80.

In addition, since the cooling oil 58 flows in the first axial fluid passage 66 of the rotational shaft 60, and the tubular member 62 is fixed to the rotational shaft 60, heat that is generated in the magnets 16 by a loss (eddy-current loss) in the magnets 16, and heat that is generated in the rotor yoke 78 by a loss (iron loss) in the rotor yoke 78 are transferred by solid heat conduction from the side wall 74 of the tubular member 62, and through the bottom 72 and the base 82, to the rotational shaft 60, and the heat is dissipated into the cooling oil 58 that flows in the first axial fluid passage 66. More specifically, according to the embodiment, by carrying out heat transfer sequentially in order of the magnets 16, the rotor yoke 78, the side wall 74, the bottom 72, the base 82, the rotational shaft 60, and the cooling oil 58, heat generated in the magnets 16 and the rotor yoke 78 can be radiated out or dissipated. Flow of heat from the rotor 14 including the magnets 16 up to the cooling oil 58 that flows through the first axial fluid passage 66 will be described in greater detail below.

In the present embodiment, the cooling oil 58 introduced into the opening 76, i.e., the cooling oil 58 that flows through the through holes 88 and the cooling oil 58 that is discharged through the second axial fluid passages 70, moves along the side wall 74 as the rotor 14 rotates, thereby cooling the rotor yoke 78 through the side wall 74. Since the magnets 16 are embedded in the rotor yoke 78, the cooling oil 58 that moves along the side wall 74 is capable of cooling the magnets 16 through the side wall 74 and the rotor yoke 78. In this case, heat generated in the magnets 16 and the rotor yoke 78 is radiated by way of heat transfer carried out successively through the magnets 16, the rotor yoke 78, the side wall 74, and the cooling oil 58.

The stator 32 comprises an annular member, which is spaced radially from the rotor 14 by a predetermined air gap, along the directions indicated by the arrows Z1, Z2. The stator 32 includes a stator core 92 and coils 96 comprising conductive wires 94 wound around the stator core 92. The cooling oil 58, which is supplied from the third outlet holes 52 of the side cover 42, cools components of the stator 32.

In addition, according to the present embodiment, the cooling oil 58 that cools the rotor 14 and the stator 32, and the cooling oil 58 that lubricates and cools the planetary gear mechanism 80 of the transmission 22 drop by gravity into an oil pan (drain) 98 at the bottom of the housing 40, and the cooling oil 58 is maintained in the oil pan 98. When the pump 56 is actuated, the cooling oil 58 maintained in the oil pan 98 is filtered by a strainer 100. The strainer 100 is connected to the pump 56 by a fluid passage 102. Therefore, the cooling oil 58, after being filtered by the strainer 100, flows through the fluid passage 102 into the pump 56, and then flows through the fluid passage 54 into the side cover 42. Consequently, when the pump 56 is actuated, the cooling oil 58 maintained in the oil pan 98 is used again to cool the rotor 14 and the stator 32, as well as to lubricate and cool the transmission 22.

As described above, when the rotor 14 rotates upon operation of the rotary electric machine 12 and the transmission 22, the pump 56 circulates the cooling oil 58 through the cooling system shown in FIG. 2 in order to supply the cooling oil 58 to the side cover 42. The rotational speed of the pump 56 preferably is commensurate with the rotational speed $N_{MOT}$ of the rotor 14. A temperature sensor 104 is mounted on the bottom of the oil pan 98 near the strainer 100 for detecting a temperature $T_{IN}$ (hereinafter referred to as a "sensing temperature $T_{IN}$") of the cooling oil 58 maintained in the oil pan 98. Since the cooling oil 58 maintained in the oil pan 98 is circulated and supplied to the side cover 42 by the pump 56, the sensing temperature $T_{IN}$, which is detected by the temperature sensor 104, represents the temperature of the cooling oil 58 immediately before the cooling oil is supplied to the rotor 14 and the transmission 22.

The resolver rotor 34 is fixed to the first protruding wall 84 of the rotor 14. The resolver stator 36 is fixed to the stator 32 in a radially outward spaced relation to the resolver rotor 34. The resolver stator 36 detects an angular displacement of the resolver rotor 34, i.e., an angular displacement of the rotor 14. It is possible to calculate the rotational speed $N_{MOT}$ of the rotor 14, i.e., the rotational shaft 60 thereof, using the angular displacement that is detected by the resolver stator 36.

[Problems Solved by the Invention]

According to the known technique disclosed in Japanese Patent No. 4572907, the magnet temperature $T_{MAG}$ is estimated based on a thermal model in which a thermal gradient is set in order of the magnets 16 of the rotor 14, the coils 96 of the stator 32, and the cooling oil 58. More specifically, the technique of Japanese Patent No. 4572907 makes an estimation of the magnet temperature $T_{MAG}$ premised on the magnet temperature $T_{MAG}$ being higher than the temperature of the coils 96, and heat being transferred from the magnets 16, through the coils 96, to the cooling oil 58.

However, in the event that the temperature of the coils 96 is higher than the magnet temperature $T_{MAG}$, heat is not radiated from the magnets 16 toward the coils 96, but instead, the magnets 16 receive heat from the coils 96, and the temperature of the magnets 16 is raised to the same temperature as that of the coils 96. More specifically, if the temperature of the coils 96 is higher than the magnet temperature $T_{MAG}$, heat cannot be radiated from the magnets 16 to the coils 96, and as a result, the accuracy with which the magnet temperature $T_{MAG}$ is estimated is adversely affected, and there is a concern that the magnet temperature will be estimated to be higher than the actual magnet temperature $T_{MAG}$.

In an actual rotary electric machine 12, since the stator 32 and the rotor 14 are separated through an air gap with low thermal conductivity, it is difficult for heat to be transferred from the coils 96 to the magnets 16 and the rotor 14 through the air gap. For this reason, heat from the magnets 16 is radiated primarily through the rotor 14. Consequently, with the technique of Japanese Patent No. 4572907, estimation of the magnet temperature $T_{MAG}$ is carried out without any consideration being given to the actual heat transfer path.

Further, with a structure in which cooling of the stator 32 and the rotor 14 is carried out separately using a stator 32 side cooling system and a rotor 14 side cooling system, as in Japanese Laid-Open Patent Publication 2000-023421, cases are known to occur in which the temperature of the coils 96 is higher than the magnet temperature $T_{MAG}$. Further, with the technique of Japanese Laid-Open Patent Publication 2000-023421, sensors must be provided, respectively, for detecting the inflow temperature and outflow temperature of the cooling oil 58, and for detecting the torque and the rotational speed of the rotary electric machine 12, leading to an increase in cost.

[Configuration of Magnet Temperature Estimating Apparatus]

As described above, with the method of estimating the magnet temperature according to the present embodiment, a process for estimating the magnet temperature $T_{MAG}$ is carried out while taking into consideration radiation and dissipation of heat of the magnets 16 and the rotor yoke 78 by way of solid heat conduction, which is transferred in order of the magnets 16, the rotor yoke 78, the side wall 74 (including the bottom 72, the base 82, and the rotational shaft 60), and the cooling oil 58. In addition, in the magnet temperature estimating apparatus 10, a thermal model is used in which a heat gradient is set in order of the above-described heat transfer path. Further, the estimation process is carried out in an ECU (Electronic Control Unit) 120 shown in FIG. 4, which controls operations of the vehicle 18 in its entirety.

More specifically, in the rotary electric machine 12, there are provided a voltage sensor 122 for detecting a voltage $V_{MOT}$ generated in the coils 96, and a current sensor 124 for detecting a current $I_{MOT}$ flowing through the coils 96. Further, the transmission 22 is combined with the resolver 38, which serves as a rotational speed sensor for detecting the rotational speed $N_{MOT}$ depending on the angular displacement of the rotor 14 and the rotational shaft 60, the temperature sensor 104, which detects the sensing temperature $T_{IN}$, and a torque sensor 126, which detects the torque $T_{qMOT}$ that acts on the rotor 14 and the rotational shaft 60.

Since the torque $T_{qMOT}$ can also be calculated from the current $I_{MOT}$ and the angular displacement of the rotor 14 and the rotational shaft 60, the torque sensor 126 may be dispensed with. The voltage sensor 122, the current sensor 124, the resolver 38, the temperature sensor 104, and the torque sensor 126 detect respective physical quantities sequentially, and supply respective analog signals, which are representative of the detected physical quantities, sequentially to the ECU 120.

The ECU 120 includes a loss calculator 128, a dissipation heat calculator 130, a magnet temperature calculator (magnet temperature estimator) 132, a motor controller 134, and a memory (storage unit) 136. The ECU 120 estimates the magnet temperature $T_{MAG}$ based on the aforementioned thermal model.

The memory 136 stores a loss map (see FIG. 10), which is representative of a relationship between the rotational speed $N_{MOT}$, the torque $T_{qMOT}$, and a loss $W_{MOT}$ caused by the rotary electric machine 12, and a flow rate map (see FIG. 11), which is representative of a relationship between the rotational speed $N_{MOT}$ and the flow rate q.

Figure 10:
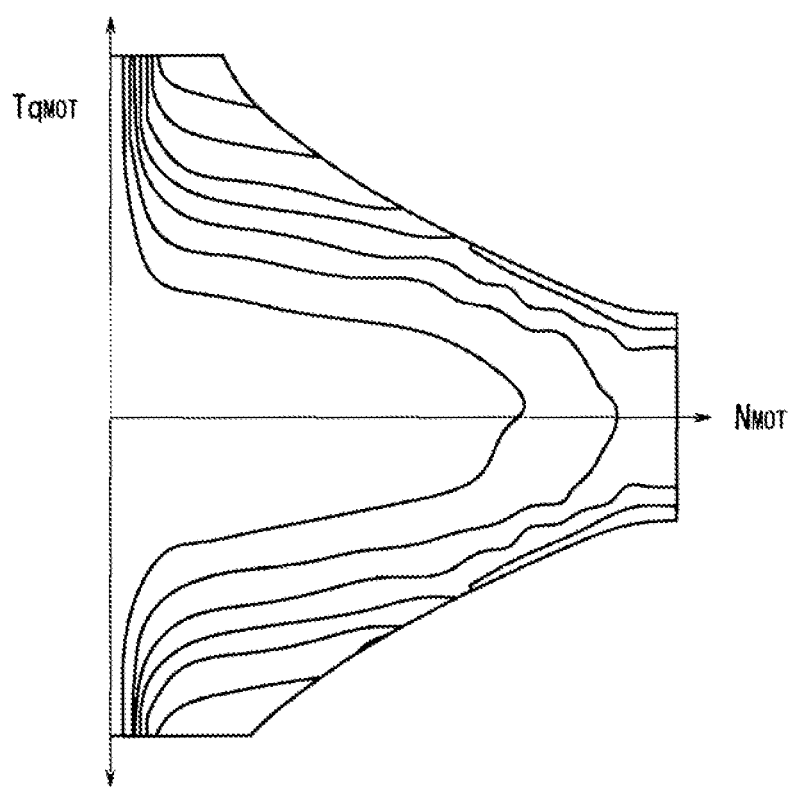
FIG. 10 is a diagram showing a loss map.

The loss calculator 128 reads the loss map shown in FIG. 10 from the memory 136, and by referring to the loss map, identifies a loss $W_{MOT}$ corresponding to the rotational speed $N_{MOT}$ based on the torque $T_{qMOT}$ and the angular displacement that is detected by the resolver 38.

The loss map shown in FIG. 10 represents data produced by measuring values of the loss $W_{MOT}$ and the rotational speed $N_{MOT}$ in advance. The loss map is illustrated as a contour map having solid-line curves that represent identical values of the loss $W_{MOT}$. The loss $W_{MOT}$ includes a loss caused by the rotor 14, which includes an eddy-current loss caused by the magnets 16 and an iron loss caused by the rotor yoke 78, and a loss caused by the stator 32, which includes a copper loss caused by the coils 96 and an iron loss caused by the stator core 92. More specifically, the aforementioned components of the rotary electric machine 12 serve as a heat source of the rotary electric machine 12. When losses caused by the components of the rotary electric machine 12 are converted into heat, the overall temperature of the rotary electric machine 12 increases. Since the rotor 14 and the stator 32 are spaced from each other by an air gap, heat transferred from the stator 32 to the rotor 14 is low. Therefore, the loss caused by the rotor 14, which includes the eddy-current loss caused by the magnets 16 and the iron loss caused by the rotor yoke 78, is primarily responsible for the increase in the magnet temperature $T_{MAG}$.

Figure 11:
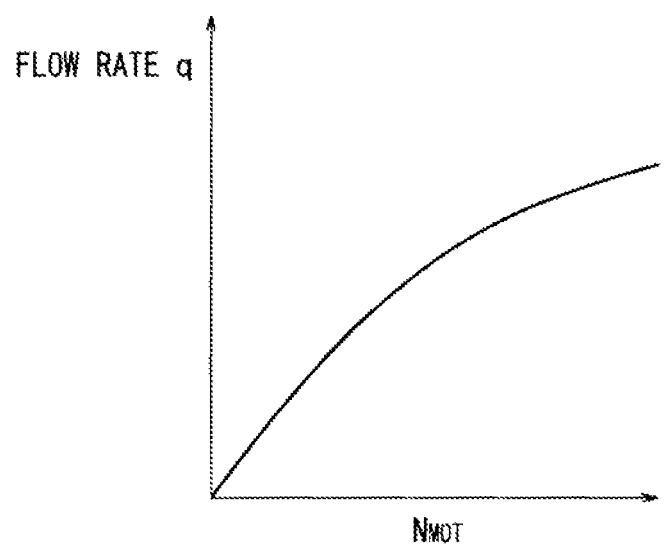
FIG. 11 is a diagram showing a flow rate map.

The flow rate map shown in FIG. 11 represents data produced by measuring beforehand values of the rotational speed $N_{MOT}$ and the flow rate q. In order to supply the cooling oil 58 to the side cover 42, the pump 56 is actuated at a rotational speed in synchronism with the rotational speed $N_{MOT}$. The flow rate q can be regarded as the flow rate of the cooling oil 58, which is supplied from the pump 56 to the side cover 42 for cooling the rotary electric machine 12 and lubricating and cooling the transmission 22.

Figure 5:
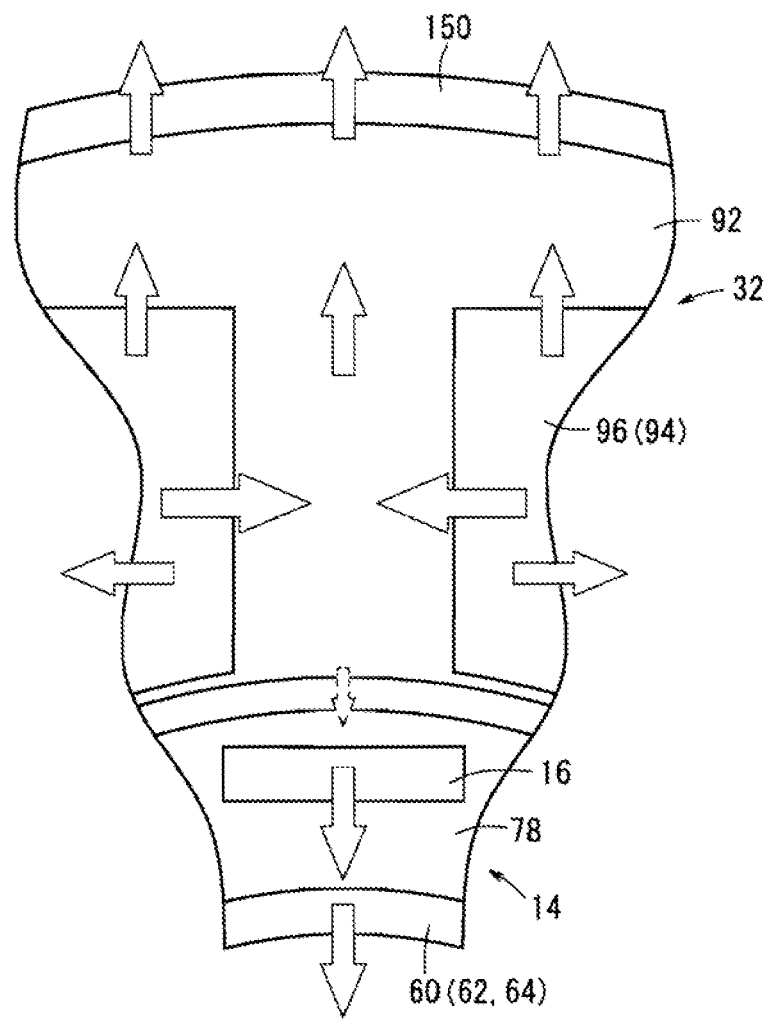
FIG. 5 is an explanatory diagram showing transfer of heat in the rotary electric machine.

In FIG. 5, the dissipation heat calculator 130 reads the flow rate map from the memory 136, and by referring to the flow rate map, identifies a flow rate q that corresponds to the calculated rotational speed $N_{MOT}$.

The dissipation heat calculator 130 also calculates a dissipation heat quantity $Q_{MOT}$, which represents a quantity of heat that is dissipated into the cooling oil 58 from the magnets 16 of the rotor 14 of the rotary electric machine 12 upon application of the cooling oil 58 to the rotor 14. The dissipation heat quantity $Q_{MOT}$ is calculated according to the following equation (1), using a heat transfer ratio h(q) between the rotor 14 and the cooling oil 58 as a function of the flow rate q, a wetting area A representing an area of the cooling oil 58 applied to the rotor 14, the temperature of the rotor 14 (rotor temperature) $T_{ROT}$, and the temperature $T_{OIL}$ of the cooling oil 58 (hereinafter referred to as a "coolant temperature $T_{OIL}$") immediately before heat is dissipated from the rotor 14 into the cooling oil 58.

$$Q_{MOT}=h(q) \times A \times (T_{ROT}-T_{OIL}) \quad (1)$$

The coolant temperature $T_{OIL}$ represents the temperature of the cooling oil 58, which is supplied from the side cover 42 to the transmission 22 and is scattered from the transmission 22 to the rotor 14, i.e., the temperature of the cooling oil 58 immediately before heat is dissipated from the rotor 14. More specifically, as indicated by the following equation (2), the coolant temperature $T_{OIL}$ is expressed as a sum of the sensing temperature $T_{IN}$ and a temperature rise $\Delta T_{OIL}$ caused by the loss $W_T$ of the transmission 22.

$$T_{OIL}=T_{IN}+\Delta T_{OIL} \quad (2)$$

In equation (1), $(T_{ROT}-T_{OIL})$ represents a temperature difference between the rotor 14 and the cooling oil 58 immediately before heat is dissipated. The rotor temperature $T_{ROT}$ is calculated using the amount of heat generated by the rotor 14 and the thermal capacity of the rotor 14, or alternatively, is calculated according to equation (1) and a later-described equation (3), using an estimated magnet temperature $T_{MAG}$, e.g., a previously estimated magnet temperature $T_{MAG}$, to be described later.

Thus, the dissipation heat quantity $Q_{MOT}$ represents a quantity of heat dissipated from the magnets 16 by the cooling oil 58, which is discharged from the through holes 88 and the second axial fluid passages 70, and is applied to the side wall 74, i.e., the cooling oil 58 applied along the route indicated by the solid-line arrows shown in FIG. 2. If the coolant temperature $T_{OIL}$ rises by a temperature rise $\Delta T_{OIL}$, which is caused by a loss in the transmission 22, as indicated by equation (1), the dissipation heat quantity $Q_{MOT}$ from the rotor 14 decreases.

The magnet temperature calculator 132 calculates a change $\Delta T_{MAG}$ in the magnet temperature $T_{MAG}$ (temperature change) according to the following equation (3). In equation (3), C represents the thermal capacity of the magnets 16 of the rotor 14.

$$\Delta T_{MAG}=(W_{MOT}-Q_{MOT})/C \quad (3)$$

Therefore, if the magnet temperature $T_{MAG}$ prior to operation of the rotary electric machine 12 already is known, or if the magnet temperature $T_{MAG}$ estimated by a preceding estimating process has been stored in the memory 136 beforehand, then the present magnet temperature $T_{MAG}$ can easily be calculated simply by adding the temperature change $\Delta T_{MAG}$ according to equation (3) to the magnet temperature $T_{MAG}$ prior to operation of the rotary electric machine 12, or to the previously estimated temperature $T_{MAG}$ (the magnet temperature $T_{MAG}$ prior to operation of the rotary electric machine 12 or the preceding magnet temperature $T_{MAG}+\Delta T_{MAG} \rightarrow$ the present magnet temperature $T_{MAG}$).

In order to control the rotary electric machine 12, the motor controller 134 supplies the PDU 30 with a control signal based on the estimated magnet temperature $T_{MAG}$ calculated by the magnet temperature calculator 132. The control signal is a signal that depends on operating points of the motor, i.e., the rotary electric machine 12, which includes a target torque (torque command value), the rotational speed $N_{MOT}$ of the rotor 14, and the current $I_{MOT}$ flowing through the coils 96, for example.

[Operation of Magnet Temperature Estimating Apparatus 10]

The magnet temperature estimating apparatus 10, which carries out the method of estimating a magnetic temperature according to the present embodiment, is constructed as described above. Next, operations of the magnet temperature estimating apparatus 10, i.e., a method of estimating a magnetic temperature, will be described.

FIG. 5 is an explanatory diagram showing transfer of heat between the rotor 14 and the stator 32.

In the rotor 14, as shown by the hollow solid-line arrows, heat that is generated due to eddy-current loss in the magnets 16 is radiated from the rotor yoke 78 via the tubular member 62 and the rotational shaft 60 (shaft 64), and by the cooling oil 58 that flows in the first axial fluid passage 66. Further, heat that is generated due to iron loss in the rotor yoke 78 also is radiated via the tubular member 62 and the rotational shaft 60 (shaft 64), and by the cooling oil 58 that flows in the first axial fluid passage 66.

Alternatively, heat generated by the magnets 16 and the rotor yoke 78 is dissipated into the cooling oil 58, which is adhered to the side wall 74 through the tubular member 62.

In either case, in the rotor 14, since the cooling oil 58 flows in the first axial fluid passage 66, the magnets 16, the rotor yoke 78, the tubular member 62, and the rotational shaft 60 become lower in temperature in this order. More specifically, a heat gradient is generated in order of the magnets 16, the rotor yoke 78, the tubular member 62, and the rotational shaft 60, and heat is radiated along a heat transfer path represented by this order.

On the other hand, in the stator 32, as shown by the hollow solid line arrows, heat generated in the coils 96 is radiated, from the stator core 92 and via a stator holder 150, by the cooling oil 58 that is adhered to the stator holder 150, or alternatively, is radiated by the cooling oil 58 that is adhered directly to the coils 96 or the stator core 92.

Further, although an air gap is present between the rotor 14 and the stator 32, since the thermal conductivity of the air gap is extremely low in comparison with the structural elements that constitute the rotor 14 and the stator 32, as shown by the hollow dashed-line arrow, a condition exists in which it is difficult for heat to be transferred between the rotor 14 and the stator 32.

Figure 6:
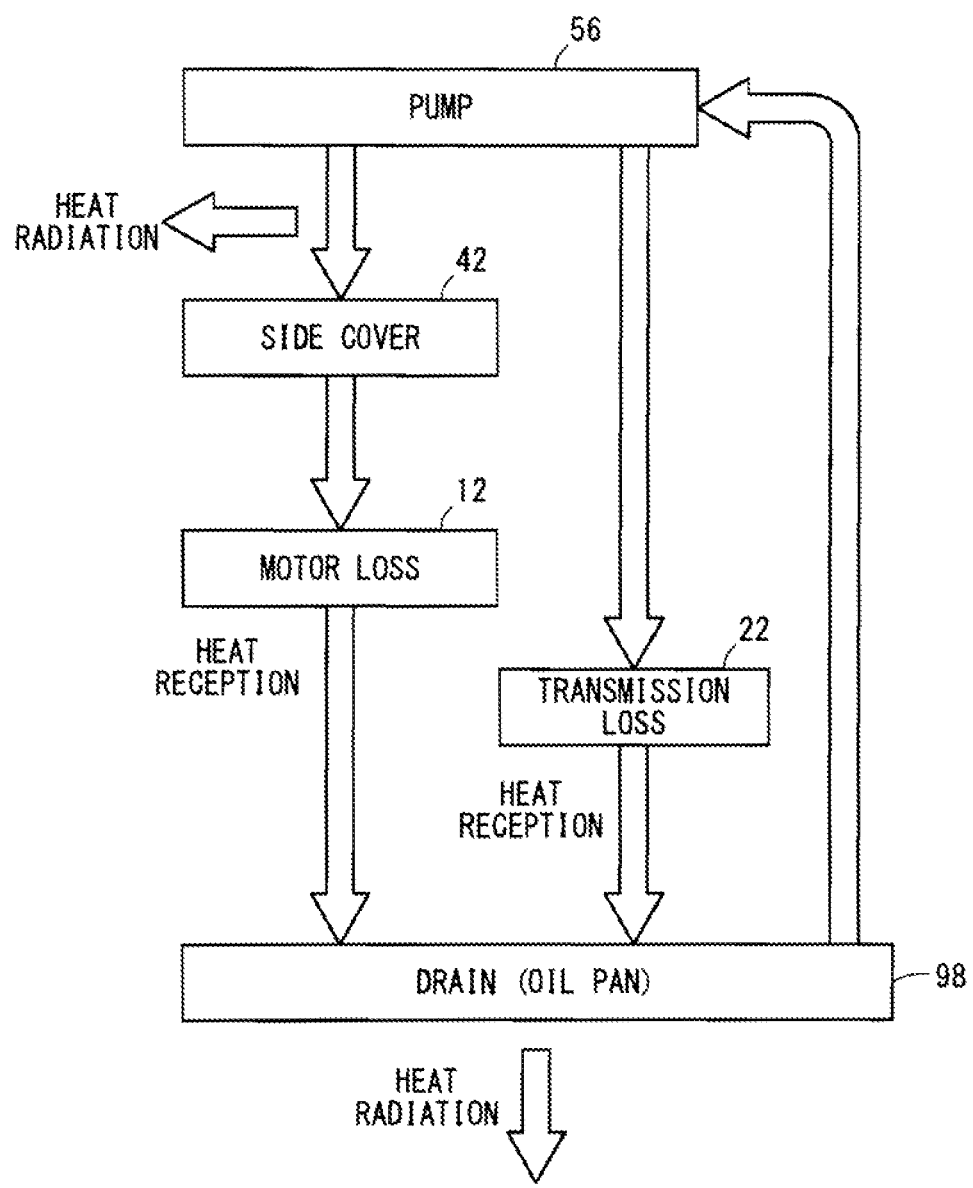
FIG. 6 is an explanatory diagram in which cooling oil circulation passages in the interior of the vehicle are shown schematically.

FIG. 6 is an explanatory diagram in which cooling oil circulation passages are shown schematically.

As noted above, the pump 56 aspirates the cooling oil 58 stored in the oil pan 98 and supplies the cooling oil 58 to the side cover 42. Consequently, the cooling oil 58 is supplied from the side cover 42 to the rotary electric machine 12 and the transmission 22, whereby cooling of the rotary electric machine 12, and both lubrication and cooling of the transmission 22 are carried out.

In this case, in the fluid passage 54 between the pump 56 and the side cover 42, heat from the cooling oil 58 is radiated to the exterior through the fluid passage 54. Further, by driving the rotary electric machine 12, in the case that heat is generated due to losses in the rotor 14 and the stator 32, the cooling oil 58 that cools the rotary electric machine 12 receives such generated heat, and thereafter, the cooling oil 58 drops by gravity into the oil pan 98. On the other hand, by driving the transmission 22, in the case that heat is generated due to losses in the transmission 22 (i.e., various losses occurring in the gears that constitute the planetary gear mechanism 80), the cooling oil 58 that lubricates and cools the transmission 22 receives such generated heat, and thereafter, the cooling oil 58 drops by gravity into the oil pan 98. The cooling oil 58, which has dropped and is stored in the oil pan 98, radiates heat to the exterior through the oil pan 98.

Accordingly, the sensing temperature $T_{IN}$ of the cooling oil 58, which is supplied to the side cover 42, also is influenced by losses of the transmission 22 and the rotary electric machine 12.

Figure 7A:
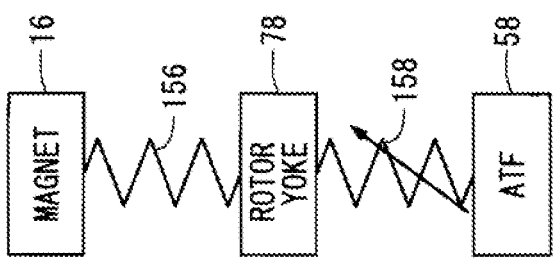
FIG. 7A is a schematic diagram showing a thermal model between a magnet, a stator coil, and a coolant according to a conventional technique.
Figure 7B:
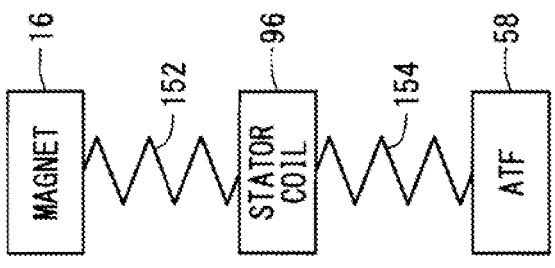
FIG. 7B is a schematic diagram showing a thermal model between a magnet, a rotor, and a coolant according to an embodiment of the present invention.

FIG. 7A shows a thermal model in which an estimation process for the magnet temperature $T_{MAG}$ is used according to Japanese Patent No. 4572907 (conventional technique), whereas FIG. 7B shows a thermal model in which an estimation process for the magnet temperature $T_{MAG}$ is used according to an embodiment of the present invention.

With the conventional technique shown in FIG. 7A, the magnets 16 are connected thermally with the coils 96 of the stator 32 through a thermal resistance 152, and the coils 96 are connected thermally with the cooling oil 58 through a thermal resistance 154. However, as discussed above, because the air gap, the thermal conductivity of which is remarkably low, is disposed between the rotor 14, which is equipped with the magnets 16, and the stator 32, the thermal resistance 152 is extremely large, whereby it is difficult for heat to be transferred between the magnets 16 and the coils 96. Consequently, dissipation of heat generated in the magnets 16 into the cooling oil 58 through the coils 96 is difficult. In addition, in the case that the coils 96 are higher in temperature than the magnets 16, heat is transferred from the coils 96 to the magnets 16 through the thermal resistance 152, leading to a concern that, on the contrary, the magnet temperature $T_{MAG}$ will actually rise.

In contrast thereto, as shown in FIG. 7B, in the present embodiment, the magnets 16 are connected thermally with the rotor yoke 78 through a thermal resistance 156, the rotor yoke 78 is connected thermally with the cooling oil 58 through a thermal resistance 158, and a thermal model is used in which a heat gradient is set in order of the magnets 16, the rotor yoke 78, and the cooling oil 58. As noted previously, because heat transfer takes place in order of the magnets 16, the rotor yoke 78, and the cooling oil 58, heat generated by the magnets 16 can be radiated or dissipated easily into the cooling oil 58 through the thermal resistance 156, the rotor yoke 78, and the thermal resistance 158.

An operation sequence carried out by the magnet temperature estimating apparatus 10 for estimating the magnet temperature $T_{MAG}$ using the thermal model described in connection with FIG. 7B will be described below with reference to FIGS. 8 through 12, as well as FIGS. 1 through 7 when necessary.

It is assumed that the rotary electric machine 12 operates as a motor when electric power is supplied from the battery 28, through the PDU 30, to the rotary electric machine 12.

When a voltage $V_{MOT}$ is applied across the coils 96 of the rotary electric machine 12, a current $I_{MOT}$ flows through the coils 96 that rotates the rotor 14, which in turn rotates the rotational shaft 60 coupled to the rotor 14.

The voltage sensor 122 detects the voltage $V_{MOT}$ and supplies a detection signal thereof to the ECU 120. The current sensor 124 detects the current $I_{MOT}$ and supplies a detection signal thereof to the ECU 120. The resolver 38 detects the angular displacement of the rotor 14 and the rotational shaft 60, and supplies a detection signal thereof to the ECU 120.

The temperature sensor 104 detects the sensing temperature $T_{IN}$ of the cooling oil 58, which is maintained in the oil pan 98, and supplies a detection signal thereof to the ECU 120. The torque sensor 126 detects the torque $T_{qMOT}$ that acts on the rotational shaft 60, and supplies a detection signal thereof to the ECU 120.

Accordingly, in step S1 of FIG. 8, the ECU 120 acquires the voltage $V_{MOT}$, the current $I_{MOT}$, the angular displacement, the sensing temperature $T_{IN}$, and the torque $T_{qMOT}$ by reading respective detection signals supplied from the voltage sensor 122, the current sensor 124, the resolver 38, the temperature sensor 104, and the torque sensor 126. The ECU 120 also calculates the rotational speed $N_{MOT}$ of the rotor 14 and the rotational shaft 60 based on the angular displacement, which is represented by the detected signal supplied from the resolver 38.

The ECU 120 actuates the pump 56 at a rotational speed commensurate with the calculated rotational speed $N_{MOT}$. Upon actuation thereof, the pump 56 draws in the cooling oil 58 that is maintained in the oil pan 98, and supplies the cooling oil 58 to the side cover 42.

The cooling oil 58 supplied to the side cover 42 is ejected or discharged from the third outlet holes 52 in order to cool the stator 32. The cooling oil 58 supplied to the side cover 42 also is ejected or discharged from the second outlet hole 50 in order to cool the rotor 14 and to lubricate and cool (the planetary gear mechanism 80 of) the transmission 22. The cooling oil 58 supplied to the side cover 42 further is ejected or discharged from the first outlet hole 48 through the axial opening 68 into the first axial fluid passage 66, and then is discharged from the second axial fluid passages 70 in order to lubricate and cool the transmission 22 including the planetary gear mechanism 80.

In this case, the cooling oil 58 flows in the first axial fluid passage 66, and since the cooling oil 58 is attached to the side wall 74 of the tubular member 62, heat that is generated by the magnets 16 is radiated (1) along a heat transfer path in order of the magnets 16, the rotor yoke 78, the tubular member 62, the rotational shaft 60, and the first axial fluid passage 66, and (2) along a heat transfer path in order of the magnets 16, the rotor yoke 78, the tubular member 62, and the cooling oil 58 that is adhered to the side wall 74.

Figure 9:
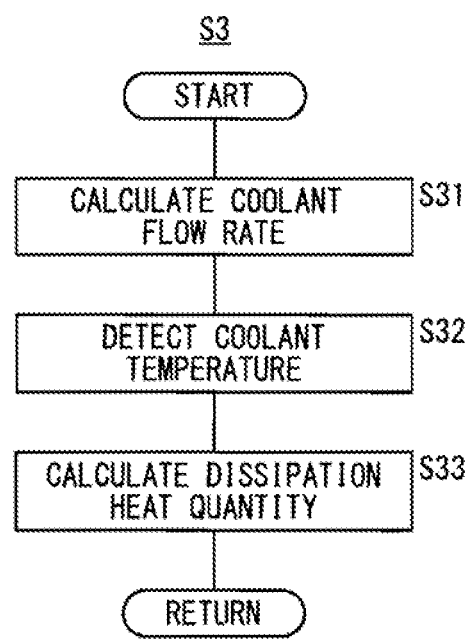
FIG. 9 is a flowchart of details of a process for calculating an amount of removed heat, as a subroutine of the sequence shown in FIG. 8.

Thus, according to the present embodiment, using the thermal model in which a thermal gradient is set by the aforementioned heat transfer paths, the operation sequence of FIG. 8, which takes place during and after step S2, and the process shown in FIG. 9 are carried out in order to estimate the magnet temperature $T_{MAG}$ accurately. Further, with the present embodiment, based on the estimation result, by appropriately managing the magnet temperature $T_{MAG}$, demagnetization of the magnets 16 caused by a rise in the magnet temperature $T_{MAG}$ can be suppressed, and the rotary electric machine 12 can be operated at full performance.

More specifically, in step S2 of FIG. 8, the loss calculator 128 of the ECU 120 calculates a loss $W_{MOS}$ caused in the rotary electric machine 12, which operates as a motor. In greater detail, the loss calculator 128 reads the loss map shown in FIG. 10 from the memory 136, and using the loss map, identifies a loss $W_{MOS}$ corresponding to the torque $T_{qMOT}$ and the rotational speed $N_{MOT}$ acquired in step S1.

In step S3, the dissipation heat calculator 130 calculates a radiated heat quantity (dissipation heat quantity $Q_{MOT}$), for a case in which heat from the rotor 14 (magnets 16) is radiated from the cooling oil 58 according to each of the aforementioned heat transfer paths. More specifically, the dissipation heat calculator 130 calculates the dissipation heat quantity $Q_{MOT}$ in accordance with the flowchart shown in FIG. 9.

In step S31 of FIG. 9, the dissipation heat calculator 130 reads the flow rate map shown in FIG. 11 from the memory 136, and using the flow rate map, identifies a flow rate q of the cooling oil 58 corresponding to the calculated rotational speed $N_{MOT}$ that was acquired in step S1.

The cooling oil 58, which has cooled the rotary electric machine 12, and the cooling oil 58, which has lubricated and cooled the transmission 22, drops by gravity into the oil pan 98 and is stored in the oil pan 98. In this case, the sensing temperature $T_{IN}$ of the cooling oil 58 that is stored in the oil pan 98 becomes a temperature in consideration of the influence of the received heat from the rotary electric machine 12 and the received heat from the transmission 22.

The temperature sensor 104 sequentially detects the temperature $T_{IN}$ of the cooling oil 58 stored in the oil pan 98. In step S32, the ECU 120 again acquires the sensing temperature $T_{IN}$ detected by the temperature sensor 104. Information concerning the acquired sensing temperature $T_{IN}$ is output to the dissipation heat calculator 130.

In step S33, using the aforementioned equations (1) and (2), the dissipation heat calculator 130 calculates a dissipation heat quantity $Q_{MOT}$, which is dissipated from the rotor 14 through the cooling oil 58.

In step S4 of FIG. 8, the magnet temperature calculator 132 calculates a change $\Delta T_{MAG}$ in the magnet temperature $\Delta T_{MAG}$ (temperature change) according to equation (3), and calculates a present magnet temperature $T_{MAG}$ by adding the magnet temperature $T_{MAG}$ prior to operation of the rotary electric machine 12, or the previously estimated magnet temperature $T_{MAG}$, to the calculated temperature change $\Delta T_{MAG}$ (preceding magnet temperature $T_{MAG}+\Delta T_{MAG} \rightarrow$ present magnet temperature $T_{MAG}$). The magnet temperature $T_{MAG}$ prior to operation of the rotary electric machine 12, or the previously estimated magnet temperature $T_{MAG}$, are stored in the memory 136, for example. The magnet temperature calculator 132 preferably stores the presently estimated magnet temperature $T_{MAG}$ in the memory 136.

In step S5, the motor controller 134 judges whether or not the magnet temperature $T_{MAG}$ has reached a limit temperature at which the magnets 16 may become demagnetized (magnet management temperature).

If the magnet temperature $T_{MAG}$ is lower than the magnet management temperature (step S5: NO), then the motor controller 134 judges that the magnets 16 are not demagnetized, and controls the PDU 30 in order to operate the rotary electric machine 12 continuously at the present torque operating points (the torque $T_{qMOT}$, the rotational speed $N_{MOT}$, the current $I_{MOT}$).

If the magnet temperature $T_{MAG}$ is equal to or greater than the magnet management temperature (step S5: YES), then the motor controller 134 judges that the magnets 16 may possibly become demagnetized. In step S6, the motor controller 134 calculates an allowable upper limit value for the torque $T_{qMOT}$ (allowable upper limit torque value). In step S7, the motor controller 134 supplies a control signal, which is representative of the calculated allowable upper limit torque value, to the PDU 30. The PDU 30 then controls the rotary electric machine 12 so that the torque $T_{qMOT}$ will not exceed the allowable upper limit torque value.

Figure 12:
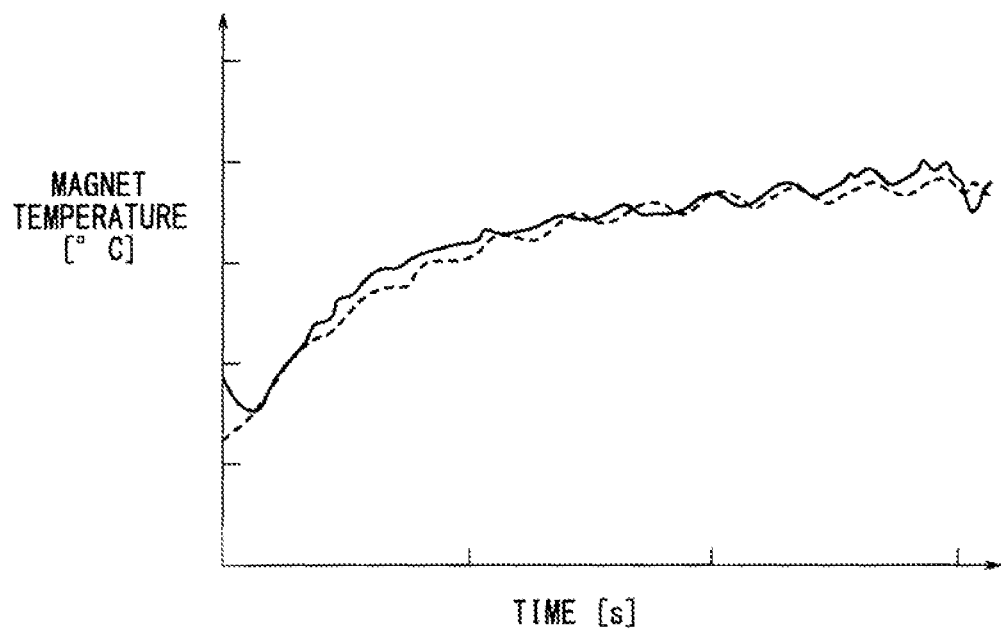
FIG. 12 is a time chart in which an estimated magnet temperature and an actually measured magnet temperature are compared.

FIG. 12 is a time chart showing an estimated magnet temperature $T_{MAG}$ (shown by the solid line in FIG. 12) and an actually measured magnet temperature $T_{MAG}$ (shown by the dashed line in FIG. 12), which were compared during actual running of the vehicle 18. It can easily be understood that the magnet temperature $T_{MAG}$ obtained by the estimation process differs only slightly from the measured magnet temperature $T_{MAG}$, and therefore that the magnet temperature estimating apparatus 10 is capable of accurately estimating the magnet temperature $T_{MAG}$ of the magnets 16 of a rotary electric machine 12 that actually is mounted in the vehicle 18. That is, in the present embodiment, even in a case where the rotary electric machine 12 is operated in a complicated manner depending on the running of the vehicle 18, it is possible to estimate the magnet temperature $T_{MAG}$ with good accuracy.

[Advantages of the Present Embodiment]

According to the present embodiment, as described above, in the event that the rotor 14 is cooled by the cooling oil 58, the magnet temperature calculator 132 of the ECU 120 estimates the magnet temperature $T_{MAG}$, based on the loss $W_{MOT}$ of the rotary electric machine 12 including the loss of the rotor 14 and the sensing temperature $T_{IN}$ of the cooling oil 58.

More specifically, in the rotary electric machine 12, the rotor 14 and the stator 32 are separated by an air gap, so that it is difficult for heat to be transferred between the rotor 14 and the stator 32. As a result, heat that is generated due to a loss (eddy-current loss) in the magnets 16 of the rotor 14 is transferred easily, via the rotor 14, into the cooling oil 58 that cools the rotor 14. Further, in the rotor yoke 78 that makes up the rotor 14, a loss (iron loss) in the rotor yoke 78 are converted into heat, and such heat is transferred to the cooling oil 58.

Thus, with the present embodiment, the magnet temperature $T_{MAG}$ is estimated while taking into consideration the sensing temperature $T_{IN}$ of the cooling oil 58 to which heat, which is transferred to the cooling oil 58 from the magnets 16 and the rotor 14, is added, and the loss $W_{MOT}$ of the rotary electric machine 12 including a loss of the rotor 14 that causes heat generation in the rotor 14. Consequently, any deviation in the estimated magnet temperature $T_{MAG}$ from the actual magnet temperature $T_{MAG}$ can be suppressed, and the magnet temperature $T_{MAG}$ can be estimated with good accuracy.

Further, since the amount of loss $W_{MOT}$ can be identified by measurements taken beforehand, as long as the sensing temperature $T_{IN}$ of the cooling oil 58 is known, the magnet temperature $T_{MAG}$ can easily be estimated. More specifically, with the present embodiment, since the sensors needed to estimate the magnet temperature $T_{MAG}$ can be limited only to the temperature sensor 104 that detects the sensing temperature $T_{IN}$, the number of sensors can be minimized, and the cost of the sensors and the number of assembly steps for such sensors can be suppressed.

In the foregoing manner, since the accuracy with which the magnet temperature $T_{MAG}$ is estimated is increased, it is possible to lower the heat resistance (demagnetization resistance) of the magnets 16, thereby reducing the coercive force of the magnets 16. Consequently, the amount of dysprosium (Dy) contained in the magnets 16 can be reduced. Consequently, it is possible to manufacture a rotary electric machine 12 that meets various specifications, and in which the magnets 16 thereof are less expensive.

Further, the rotary electric machine 12 may be controlled by a control system, in which the rotary electric machine 12 is required to enter a power save mode each time that the magnet temperature $T_{MAG}$ approaches a limit temperature (upper limit temperature). In such a control system, since the accuracy with which the magnet temperature $T_{MAG}$ is estimated is increased, the power save mode is prevented from being carried out unnecessarily, and the frequency at which the rotary electric machine 12 enters the power save mode is lowered. As a result, fuel consumption of the vehicle 18 is reduced during times that the vehicle 18 is placed under high loads, and the drivability and commercial value of the vehicle 18 are increased.

In addition, since the magnet temperature calculator 132 estimates the magnet temperature $T_{MAG}$ based on a thermal model in which a thermal gradient is set in order of the magnets 16, the rotor 14, and the cooling oil 58, in the rotary electric machine 12 in which the rotor 14 is cooled by the cooling oil 58, the magnet temperature $T_{MAG}$ can be estimated accurately even in the event that the temperature of the coils 96 of the stator 32 becomes greater than the magnet temperature $T_{MAG}$.

In particular, if, by having the cooling oil 58 flow through the first axial fluid passage 66 of the rotational shaft 60, which is in the form of a tubular member, the rotational shaft 60 is cooled in the rotary electric machine 12, heat transfer can be performed in order of the magnets 16→the rotor 14→the cooling oil 58, and therefore, the aforementioned effects can easily be obtained.

Since the loss calculator 128 identifies the loss $W_{MOT}$ corresponding to the rotational speed $N_{MOT}$ and the torque $T_{qMOT}$ at an operating point of the rotary electric machine 12 by referring to the loss map, the loss $W_{MOT}$ can be calculated easily and accurately. Further, when a vehicle 18 having the rotary electric machine 12 mounted therein is running, even in the event that the rotary electric machine is operated in a complex manner due to the way in which the vehicle 18 is running, by determining the loss $W_{MOT}$ corresponding to the rotational speed $N_{MOT}$ and the torque $T_{qMOT}$ with reference to the loss map, the magnet temperature $T_{MAG}$ can be estimated with good estimation accuracy.

The torque $T_{qMOT}$ may be detected by the torque sensor 126, or the torque $T_{qMOT}$ may also be calculated from an angle of rotation and the current $I_{MOT}$ that flows in the coils 96, which is detected by the current sensor 124. Since the loss $W_{MOT}$ is calculated using the current $I_{MOT}$ that forms an operating point of the rotary electric machine 12, the loss $W_{MOT}$ can be calculated easily and accurately.

The dissipation heat calculator 130 calculates the dissipation heat amount $Q_{MOT}$ based on the flow rate q of the cooling oil 58 and the sensing temperature $T_{IN}$, and the magnet temperature calculator 132 estimates the magnet temperature $T_{MAG}$ based on the calculated loss $W_{MOT}$ and the calculated dissipation heat amount $Q_{MOT}$. Therefore, any deviation between the estimated magnet temperature $T_{MAG}$ and the actual magnet temperature $T_{MAG}$ can be suppressed to a greater degree. In this case, the dissipation heat calculator 130 determines the flow rate q corresponding to the rotational seep $N_{MOT}$, by referring to the flow rate map, which is stored in the memory 136. In this manner, the flow rate q can be calculated easily and accurately, and the dissipation heat amount $Q_{MOT}$ can be calculated with greater accuracy. Further, when a vehicle 18 having the rotary electric machine 12 mounted therein is running, even in the event that the rotary electric machine 12 is operated in a complex manner due to the way in which the vehicle 18 is running, by determining the flow rate q corresponding to the rotational speed $N_{MOT}$ with reference to the flow rate map, the magnet temperature $T_{MAG}$ can be estimated with good estimation accuracy.

Further, since the temperature sensor 104, which detects the sensing temperature $T_{IN}$, is disposed in the oil pan 98 in which the cooling oil 58 is stored after heat has been dissipated therein, the magnet temperature calculator 132 can estimate the magnet temperature $T_{MAG}$ easily based on the loss $W_{MOT}$ and the sensing temperature $T_{IN}$ detected by the temperature sensor 104. Moreover, since the cooling oil 58 is aspirated by the pump 56 and supplied to the side cover 42, the rotary electric machine 12 and the transmission 22 can be cooled with good efficiency.

Further, with the rotary electric machine 12 comprising a magnet-embedded type of rotor 14 in which the magnets 16 are embedded, heat of the magnets 16 is transferred to the rotor yoke 78 that surrounds the magnets 16, whereby a large thermal influence is received by the rotor yoke 78. In this case as well, through application of the present embodiment, and by taking into consideration the heat that is generated due to a loss (eddy current loss) of the magnets 16, and heat that is generated due to a loss (iron loss) of the rotor yoke 78, estimation errors in estimating the magnet temperature $T_{MAG}$ can be reduced.

Although a preferred embodiment of the present invention has been shown and described in detail above, it should be understood that various changes and modifications may be made to the embodiment without departing from the

What is claimed is:

1. A method of estimating a magnet temperature of magnets of a rotary electric machine, the rotary electric machine having a rotating member that includes the magnets, at least the rotating member of the rotary electric machine being cooled by a coolant, the method comprising:
   detecting a temperature of the coolant in a circulation passage of the coolant;
   calculating a temperature of the coolant immediately before the coolant comes into contact with the rotating member, taking the detected temperature of the coolant and a temperature change until the coolant comes into contact with the rotating member into account,
   estimating the magnet temperature with a magnet temperature estimator based on the temperature of the coolant immediately before the coolant comes into contact with the rotating member and a previously determined loss of the rotating member including the magnets,
   wherein the coolant cools the rotating member after being supplied to a transmission, and
   the temperature change until the coolant comes into contact with the rotating member is caused by a loss of the transmission.

2. The method of estimating a magnet temperature according to claim 1, wherein the magnet temperature estimator estimates the magnet temperature based on a thermal model in which a thermal gradient is set in order of the magnets, the rotating member, and the coolant.

3. The method of estimating a magnet temperature according to claim 2, wherein the rotating member including the magnets is cooled by cooling, with the coolant, a rotational shaft of the rotating member.

4. The method of estimating a magnet temperature according to claim 3, wherein:
   the rotational shaft comprises a tubular member; and
   the rotational shaft is cooled by flow of the coolant through a hollow portion of the tubular member.

5. The method of estimating a magnet temperature according to claim 2, wherein a loss calculator calculates the loss of the rotating member based on a rotational speed and a torque of the rotating member.

6. The method of estimating a magnet temperature according to claim 5, wherein:
   a loss map representative of a relationship between the rotational speed, the torque, and the loss is stored in a storage unit; and
   the loss calculator determines the loss corresponding to the rotational speed and the torque by referring to the loss map.

7. The method of estimating a magnet temperature according to claim 5, wherein:
   the rotational speed is detected by a rotational speed sensor and is output to the loss calculator; and
   the torque is detected by a torque sensor and is output to the loss calculator, or alternatively, the torque is calculated by the loss calculator using a value of a current that flows in the rotary electric machine, which is detected by a current sensor.

8. The method of estimating a magnet temperature according to claim 1, wherein:
   a dissipation heat calculator calculates a dissipation heat amount of the magnets based on a flow rate and the temperature of the coolant; and
   the magnet temperature estimator estimates the magnet temperature based on the calculated loss and the calculated dissipation heat amount.

9. The method of estimating a magnet temperature according to claim 8, wherein:
   a flow rate map, which is representative of a relationship between a rotational speed of the rotating member and the flow rate, is stored in a storage unit; and
   the dissipation heat calculator determines the flow rate corresponding to the rotational speed by referring to the flow rate map.

10. The method of estimating a magnet temperature according to claim 1, wherein:
    the rotary electric machine is accommodated in a casing;
    a bottom of the casing is formed as a drain in which the coolant that has cooled the rotating member is stored;
    a temperature sensor, which detects the temperature of the coolant stored in the drain, and a pump, which aspirates the coolant stored in the drain and delivers the coolant to the rotating member, are disposed in the casing; and
    the magnet temperature estimator estimates the magnet temperature based on the loss, and the temperature detected by the temperature sensor.

11. The method of estimating a magnet temperature according to claim 1, wherein the rotating member is an inner rotor type and magnet-embedded type of rotating member, in which the magnets are embedded in the rotating member.

12. The method of estimating a magnet temperature according to claim 1, wherein:
    the rotary electric machine is a vehicular rotary electric machine for driving a vehicle, wherein the rotary electric machine is mounted in the vehicle and the rotating member thereof is connected to a transmission; and
    the coolant comprises a lubricating oil for performing lubrication of the transmission.

13. A method of estimating a magnet temperature of magnets of a rotary electric machine, the rotary electric machine having a rotating member that includes the magnets, the method comprising:
    estimating the magnet temperature with a magnet temperature estimator based on a temperature of a coolant and a loss of the rotating member including the magnets when at least the rotating member of the rotary electric machine is cooled by the coolant; and
    calculating a dissipation heat amount of the magnets with a dissipation heat calculator based on a flow rate and the temperature of the coolant,
    wherein the magnet temperature estimator estimates the magnet temperature based on the calculated loss and the calculated dissipation heat amount,
    wherein a flow rate map, which is representative of a relationship between a rotational speed of the rotating member and the flow rate, is stored in a storage unit, and
    wherein the dissipation heat calculator determines the flow rate corresponding to the rotational speed by referring to the flow rate map.

* * * * *